340-870.14 SR SEARCH ROOM
OR 2,689,950

Sept. 21, 1954 A. J. BAYLISS ET AL 2,689,950

ELECTRIC PULSE CODE MODULATION TELEMETERING

Filed Jan. 13, 1953 3 Sheets-Sheet 1

INVENTORS
ALAN JOHN BAYLISS
LUIS CHARLES STENNING
BY
ATTORNEY

ELECTRIC PULSE CODE MODULATION TELEMETERING

INVENTORS
ALAN JOHN BAYLISS
LUIS CHARLES STENNING
BY
ATTORNEY

INVENTORS
ALAN JOHN BAYLISS
LUIS CHARLES STENNING
BY [signature]
ATTORNEY

Patented Sept. 21, 1954 2,689,950

UNITED STATES PATENT OFFICE 2,689,950

ELECTRIC PULSE CODE MODULATION TELEMETERING

Alan John Bayliss, Wembley, and Luis Charles Stenning, Beaconsfield, England, assignors to The General Electric Company Limited, London, England, a British company Application January 13, 1953, Serial No. 331,088

Claims priority, application Great Britain January 18, 1952

8 Claims. (Cl. 340—183)

The present invention relates to electric pulse code modulation signalling systems. In such a system spurious pulses received at the receiver may have the effect of inserting a false signal pulse or cancelling a signal pulse, with the result that a false representation will be given at the receiver. In most forms of pulse code modulation signalling systems this would result in distortion of or interference with the received signal or some like effect, but in a pulse code modulation telemetering system it will merely result in a false meter reading without any indication that interference has occurred. In a system for example in which simple addition binary coding is used the error may be serious particularly if the spurious pulse occurs at the time position of the "heaviest" pulse of a code group, that is the one which, when present, represents half the full scale meter reading. It is desirable therefore, particularly in pulse code modulation telemetering systems, to provide some means of checking whether the transmitted signals are received correctly and to give some form of warning if they are not.

According to the present invention an electric pulse code modulation signalling system includes means at a transmitter for counting the number of pulses transmitted in each of a series of intervals of time during operation, means for transmitting at the end of each said interval a check signal representing the number of pulses counted in that interval, means at a receiver, which in operation receives the signals transmitted by the said transmitter, for counting the number of pulses received in the corresponding recurrent interval of time, and means at the receiver responsive to receipt of the check signals for comparing the number of pulses transmitted and received in corresponding interval of time and for operating a switch, indicator or other device if the numbers are not equal.

If the system is a multichannel one the said recurrent interval of time may conveniently be the channel recurrence periods, that is those intervals during which one code group from very operative signal channel is transmitted or received.

Figure 1:
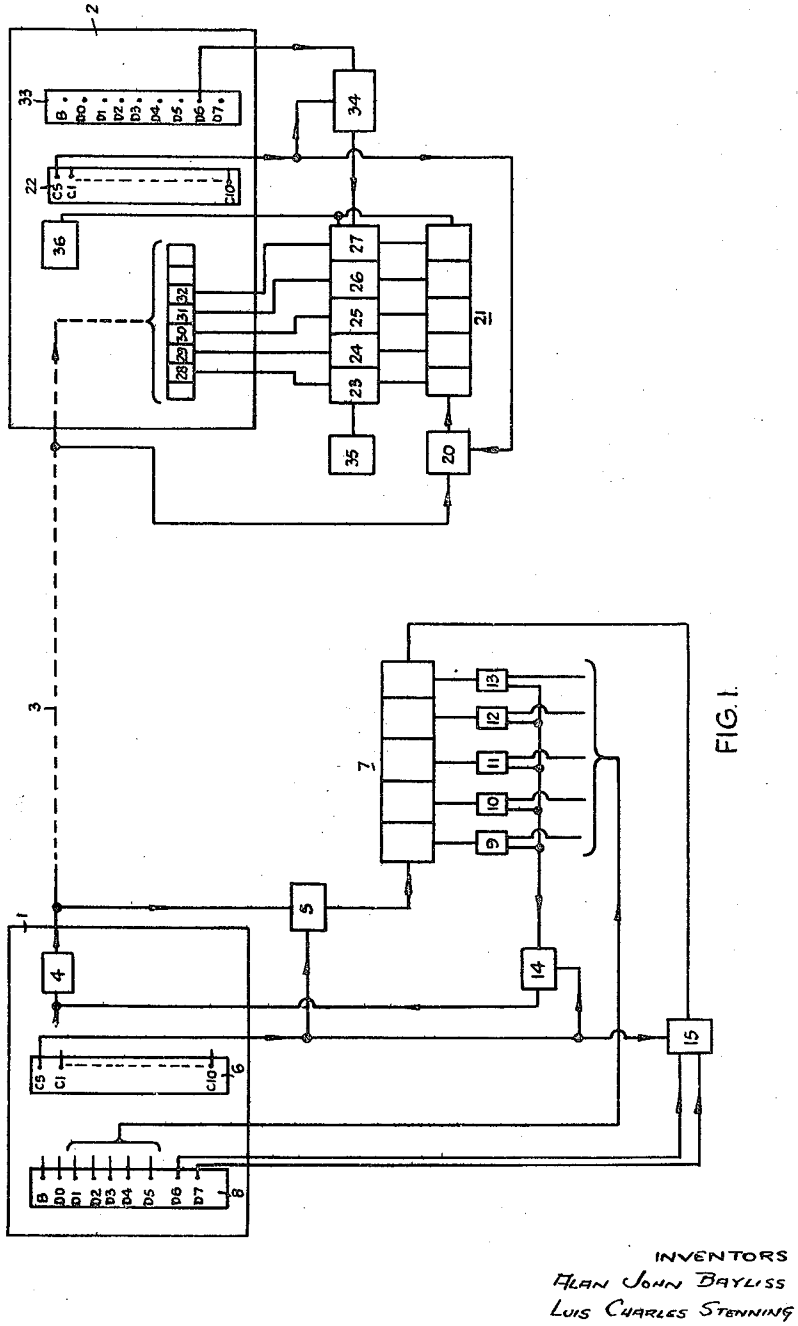
Figure 2:
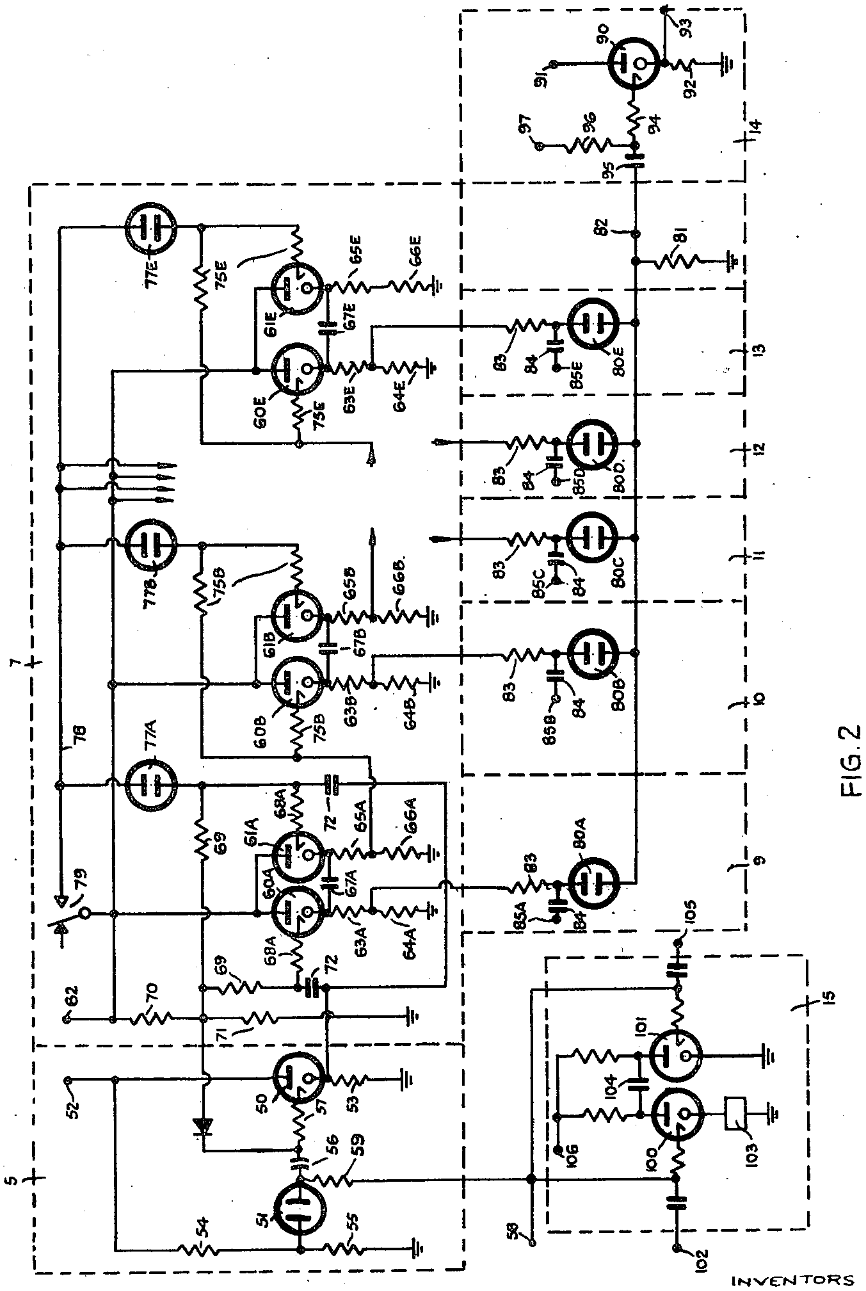
Figure 3:
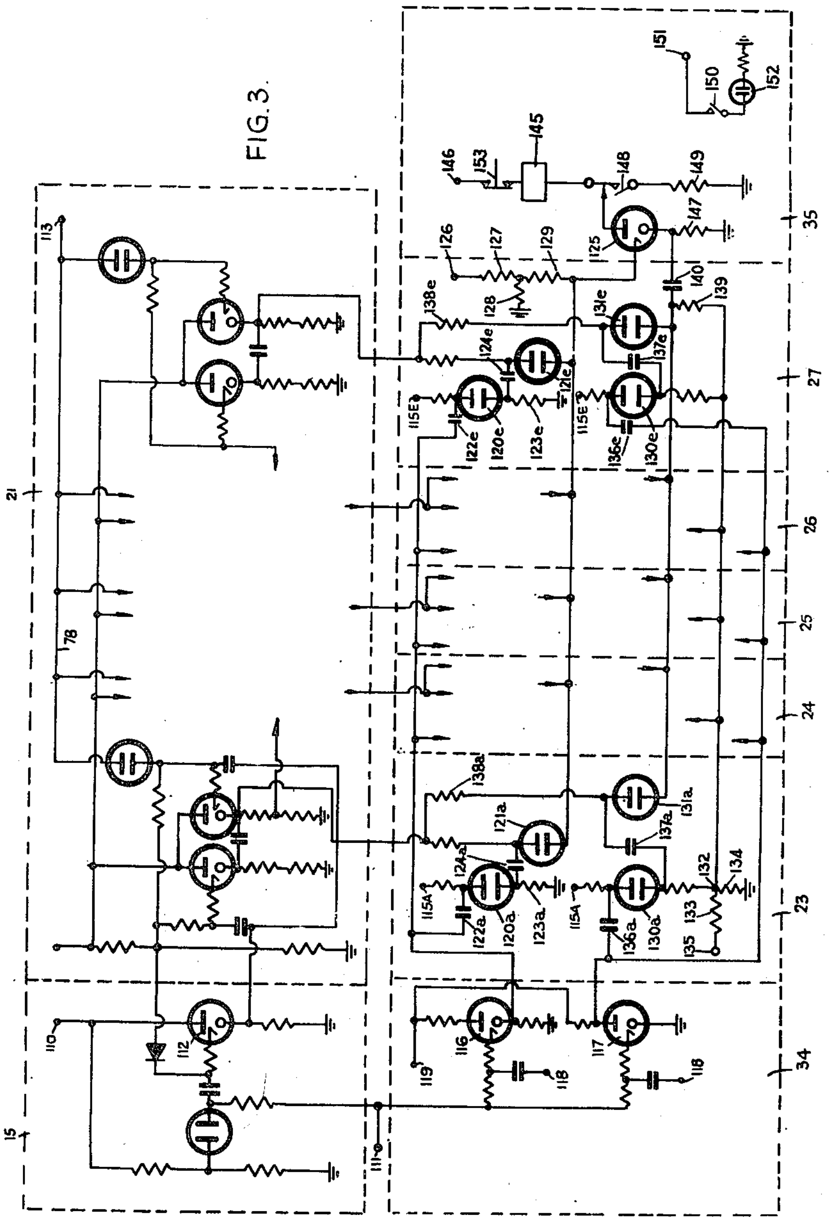

Parts of an electric pulse code modulation telemetering system in accordance with the present invention will now be described by way of example with reference to the accompanying drawings in which, Figure 1 shows a block circuit diagram of the system, Figure 2 shows a detailed circuit diagram of part of the block circuit of Figure 1, and Figure 3 shows a detailed circuit diagram of other parts of the block circuit of Figure 1.

The system is a multichannel pulse code modulation telemetering system, having ten separate telemeter channels and one other channel which is used for passing synchronising signals from the transmitter to the receiver. The system employs time division multiplex techniques, and the intervals allotted to the various channels are all of equal duration and are interlaced with one another in regular order, the beginning of one interval coinciding with the end of the previous one. At both the transmitter and the receiver a channel distributor is provided which generates at each of eleven separate outputs, a regularly recurrent pulse train having the channel recurrence frequency, the pulse trains each defining the intervals allotted to a different one of the channels, and therefore being timed relative to one another so that between any two pulses of one train, a pulse of each of the other trains occurs in order.

Binary coding is employed, and the pulse code groups transmitted over the telemetering channels each have eight time positions at which a short pulse may occur, one pulse code group being transmitted during each channel interval. The eight time positions in each group are spaced regularly over the channel interval during which it is transmitted and it is arranged in fact that the time positions of all the channels together with the time positions, at which the channel interval boundaries occur, form a complete regularly recurrent sequence of time positions. A pulse is always transmitted at the first time position in each group, representing in effect a zero value, and being included mainly to ensure that the recurrence frequency of a pulse generator at the receiver is accurately synchronised to that of the master pulse generator which controls the pulse recurrence frequency of the transmitter distributors. During the synchronising channel intervals, pulses are transmitted at each of the first six time positions, and these are followed by a longer pulse starting at the seventh time position and lasting to the end of the channel interval. Apart from the longer synchronising pulse, the pulses which may occur at the corresponding time positions in successive channel intervals, form part of a regularly recurrent train of pulses. The system therefore includes at the transmitter equipment known as the digit distributor, which generates, under the control of the master pulse generator a regularly recurrent train of pulses at each of nine separate outputs, one train being timed so that the pulses occur at the boundaries of the channel intervals, and the other eight trains, known as the digit pulse trains, being timed so that the pulses of any one occur at the same time position in successive channel intervals, that position being different for each train. The said one pulse train is applied to the channel distributor to synchronise its operation.

Each channel has a coding apparatus, which, during a coding operation, sets up the condition of eight relays so that a contact associated with each is either closed or left open in accordance with a sampled quantized value of the quantity to be telemetered, a binary scale being employed. These relay contacts are associated in each channel with eight gating circuits, through which pulses may pass only if the associated one of the eight contacts is closed. Pulses from the channel distributor also control the gating circuits, and are applied so that the group of gating circuits of any one channel may open only during the intervals allotted to the channel to which the group belongs. The digit pulse trains are applied to the corresponding gating circuit in each group through the associated contact of the coding apparatus. A particular group of gating circuits can only pass pulses however when a pulse is applied from the channel distributor during the intervals of the channel with which it is associated. During the appropriate channel intervals therefore the digit pulses are passed through some or all of the group of gating circuits belonging to that channel, in dependence upon the condition of the relay contacts which are previously set up in dependence upon a sample of the quantity to be signalled on the channel.

The outputs from all the gating circuits which outputs together form an interlaced train of pulse code groups are applied to a common output unit which reshapes the pulses and passes them to a communication link for example a line or radio link.

At the receiver, the received pulses are applied to synchronise the frequency of a pulse generator which is similar to the master pulse generator at the transmitter, and generates a train of pulses which recur at the boundaries of all the channel intervals and at all the time positions in each channel interval. Digit and channel distributors are provided identical with those at the transmitter, their frequency being controlled by the receiver pulse generator, and the long synchronising pulses being separated and employed to ensure that the phase of operation of the channel distributor at the receiver is synchronised to that of the channel distributor at the transmitter. Each pulse code group is registered on receipt, by means of circuits controlled by the digit distributor, on a group of eight digit present valves which are rendered conducting if in any received pulse code group there is a pulse at the corresponding time position. The digit present valves are all rendered non-conducting again at the end of each pulse code group in readiness for the next group, but before this happens the state of the digit present valves is transferred under the control of the distributor to a decoder circuit associated with the channel to which the group belongs.

In accordance with present invention the above system is modified by including a counter which is connected to the output of the transmitter and counts the number of pulses transmitted in each set of ten signal channel intervals occurring between successive synchronising channel intervals. The five short pulses, which normally occur at the second-sixth time positions in the synchronising channel intervals are then coded to transmit a five digit pulse code group representing the number of pulses counted by the counter in the previous ten channel intervals. At the receiver a similar counter is connected to the input from the link over which the pulses are passed to the receiver from the transmitter. On receipt of the pulse code group in a synchronising channel interval representing the number of pulses counted at the transmitter, the number of pulses received during the previous ten channel intervals is compared with the number transmitted, and, if there is a difference due for example to the receipt of some interfering pulses, an alarm or indicating device is operated to show this. In this particular system a maximum of 80 pulses may be transmitted during ten signal channel intervals, so that, using binary coding, a seven time position pulse code group is needed to represent the numbers counted completely. On the other hand one could employ single stage binary counters at both the transmitter and the receiver and an indication of an error would then be given if the number counted by one was odd and by the other even. This would give only a partial check of the accuracy of the system, as an error might result in the counts differing by even number, but it might be acceptable in circumstances where simplicity is essential. In the example to be described below, five stage binary counters are employed in conjunction with the five spare pulse positions in the synchronising channel intervals, thereby providing an intermediate accuracy check lying between the two extremes that have been outlined.

Figure 1 of the accompanying drawings shows a block circuit diagram of the system. The blocks representing the transmitter 1 and the receiver 2 of the basic system, which are shown connected by a link 3 represented by a dotted line, are shown having various smaller blocks within them representing the parts which are utilised in carrying out the present invention. The normal operation of these parts has been outlined above.

At the transmitter 1, the output pulses from the output unit 4, besides being fed to the link 3, are fed to a gating circuit 5. The gating circuit 5 is controlled by the synchronising channel output from the terminal CS of the channel distributor 6, to pass the pulses applied to it to the input of a five stage binary counter 7 at all times except during the synchronising channel intervals.

At the same time the outputs from the terminals D1–D5 of the digit distributor 8 are applied to the inputs of five gating circuits 9–13 respectively. The pulses applied to these gating circuits 9–12 are those occurring respectively at the second-sixth time positions of every pulse code group. The gating circuits 9–13 are each controlled by a corresponding one of the five stages of the counter 7, to pass the applied pulses to their outputs if the controlling stage of the counter 7 is "on." The outputs from the gating circuits 9–13 are connected together and applied to a further gating circuit 14, which is controlled by an output from the terminal CS of the channel distributor 6 to pass the pulses applied to its input only during the synchronising channel intervals. The output from the gating circuit 14 is applied to the input of the output unit 4 together with the outputs from the digit pulse gating circuits of the transmitter 1. In the latter the digit pulse gating circuits for the second-sixth digit pulses in the synchronising channel are omitted. Some or all of the five pulses in the synchronising channel groups are therefore transmitted depending on the number of pulses counted by the counter 7 in the previous ten channel intervals.

A reset circuit 15 is included, which is supplied with pulses from the terminals D6 and D7 of the digit distributor 8 over separate leads, and also with pulses from the terminal CS of the channel distributor 6. The latter pulses control the reset circuit 15 so that it may only operate during the synchronising channel intervals. Thus when a pulse is applied to the reset circuit 15 from terminal D6 of the digit distributor 8 during a synchronising channel interval, the reset circuit 15 operates to reset and hold the counter 7 in its datum condition. The pulses subsequently applied from terminal D7 of the digit distributor 8 return the reset circuit to its normal condition, thereby releasing the counter 7 and permitting it to operate again starting from its datum condition. This will occur after the pulse code group representing the number of pulses transmitted during the previous ten channel intervals has been pased to the output unit 4, the counter circuit thereby being set up in readiness to count the number of pulses transmitted during the succeeding ten channel intervals.

At the receiver 2, the pulses received from the link 3, besides being applied to the receiver proper are passed through a gating circuit 20 to a five stage binary counter 21 similar to the counter 7 associated with the transmitter 1. As at the transmitter 1, the gating circuit 20 is controlled by the output from the terminal CS of the receiver channel distributor 22, to pass the received pulses to the counter 21 at all times except during the synchronising channel intervals.

The five stages of the counter 21 are each connected to the corresponding one of five comparison circuits 23–27, as also are the second-sixth digit present circuits 28–32 of the receiver 2. Pulses from the terminal D6 of the receiver digit distributor 33 are applied through a gating circuit 34 to the comparison circuits 23–27. The gating circuit 34 is controlled by pulses applied to it from terminal CS of the channel distributor 22, to pass the pulses applied to it only during the synchronising channel intervals. As previously mentioned the output from the gating circuit 34 is applied to the comparison circuits 23–27, which simultaneously on application of a pulse compare the state of the valves in the digit present circuits 28–32 with that of the valves in the corresponding stages of the counter 21. If the states of the two sets of valves do not correspond to the same number, the alarm circuit 35 is operated by an output from one or more of the comparison circuits 23–27 to indicate this condition. If on the other hand they do correspond to the same number, no action ensues. It will be appreciated that this comparison occurs at the seventh time position in each synchronising channel interval, when the digit presents circuits 28–32 are set up in accordance with the pulse code group received during that interval, i. e. in accordance with the number of pulses counted at the transmitter.

A synchronisation relay circuit 36 is provided in the receiver 2, which responds to the longer pulses transmitted at the end of each synchronising channel interval. The relay circuit 36 is arranged so that a relay is operated shortly after the seventh time position in the synchronising channel intervals until the end of those intervals. Contacts of this relay are employed to break the high tension voltage supplies to the counter 21 and to the comparison circuits 23–27, thereby resetting them to their datum conditions.

Figure 2 shows a detailed circuit diagram of the parts of the block diagram of Figure 1 associated with the transmitter 1, the various blocks of Figure 1 being indicated by the dotted outlines in Figure 2, which are given the same references as in Figure 1.

The gating circuit 5 includes a cold cathode triode 50 and a cold cathode diode 51 The terminal 52 is connected to the output of the transmitter 1, and in consequence positive pulses of 150 volts amplitude are applied to the gating circuit 5 at the terminal 52, which is connected directly to the anode of the triode 50. A cathode load resistor 53 is connected between the cathode of the triode 50 and earth, the output from the gating circuit 5 being taken from across this resistor 53. A potentiometer chain, comprising the resistors 54 and 55, is connected across the terminal 52 and earth, a proportion of the voltage pulses applied at the terminal 52 being applied therefore to the anode of the diode 51 which is connected to the common terminals of the resistors 54 and 55. A coupling capacitor 56 and a trigger load resistor 57 are connected in series between the cathode of the diode 51 and the trigger electrode of the triode 50.

The terminal 58 in Figure 2 is connected to the terminal CS of the channel distributor 6 (Figure 1), so that positive voltage pulses lasting for the duration of the synchronising channel intervals are applied at the terminal 58 and the cathode of the diode 51, which is connected to it, is therefore biassed positively for the duration of the synchronising channel intervals.

In operation therefore, at any time other than during a synchronising channel interval, when a pulse is applied to the terminal 52, a sufficient positive potential is applied to the anode of the diode 51 to fire it, thereby passing a positive voltage pulse to the trigger electrode of the triode 50, sufficient to fire the trigger electrode-cathode discharge gap. At the same time the pulse potential of 150 volts is applied to the anode of the triode 50, and the main discharge gap of the triode 50 is also fired, the triode 50 remaining conducting for the duration of the pulse applied at the terminal 52. This will result in a positive voltage pulse appearing across the cathode load resistor 53, and being applied to the input of the counter 7 which is coupled across the resistor 53. During a synchronising channel interval however, the positive bias applied to the cathode of the diode 51 is sufficient to prevent it being fired by the application of a pulse at the terminal 52. In consequence the pulse is not applied to the trigger electrode of the triode 50, which is not then fired by the voltage pulse applied to its anode. In this way positive voltage pulses appear across the load resistor 53 corresponding to all the pulses transmitted except those which occur during the synchronising channel intervals.

The output appearing across the resistor 53 of the gating circuit 5 is applied to the first stage of the five stage binary counter 7, each stage of which includes a pair of cold cathode triodes connected in a bistable trigger circuit. Thus in the first stage, there are the two triodes 60*a* and 61*a*, the anodes of which are connected together and to the terminal 62, to which a positive high tension voltage is applied in operation. Load resistances each comprising two resistors 63*a* and 64*a* or 65*a* and 66*a* in series are connected between the cathodes of the triodes 60*a* and 61*a* respectively and earth, and a coupling capacitor 67*a* is connected between their cathodes. Each triode has a trigger load resistor 68 connected to the trigger electrode, the other ends of the resistors 68*a* being connected through stopper resistances 69 to the common terminals of the resistors 70 and 71, the latter forming a potentiometer chain connected between the terminal 62 and earth. In addition coupling capacitors 72 are connected between the cathode of the triode 50 and the ends of the trigger load resistors 68*a* remote from the trigger electrodes.

The pulses appearing at the cathode of the triode 50 are therefore applied to the trigger electrodes of both the triodes 60*a* and 61*a*, which are biased to a positive potential such that these pulses are able to fire the triodes 60*a* and 61*a*. Firing of either of the triodes 60*a* or 61*a* causes a positive pulse to be applied to the cathode of the other through the capacitor 67*a*, the amplitude of this pulse being sufficient to cause the other triode to be extinguished. As a result the triodes 60*a* and 61*a* are fired alternately by the pulses applied to them by the gating circuit 5, each valve remaining conducting until the other is fired by a succeeding pulse, when the pulse passed through the coupling capacitor 67*a* on firing the other triode extinguishes it. The potential at the common terminal of the resistors 65*a* and 66*a* in the cathode circuit of the triode 61*a* is applied to the second stage of the counter 7. It takes the form of a steady potential whilst the triode 61*a* is conducting, followed by a positive pulse when triode 60*a* is fired, the potential decaying slowly from the peak pulse potential, until the triode 61*a* is fired again when the steady potential is again established.

The remaining stages of the counter 7, of which only the second and fifth are shown in Figure 2, the external connections to the third and fourth stages being indicated by arrows, are slightly different from the first in that there is no separate arrangement for biasing the cold cathode triodes 60 and 61. The elements in the remaining stages having the same connections as those in the first stage are given the same references with the different suffixes *b*, *c*, *d*, or *e* according to the stage to which they belong. It will be seen that in the second stage for example, the trigger load resistors 75*b* and 76*b*, the latter being constituted by two resistors connected in series, are connected together to the common terminals of the resistors 65*a* and 66*a* in the first stage. The positive potential applied to the trigger electrodes of the triodes 60*b* and 61*b*, when the triode 61*a* is conducting, is sufficient to enable the succeeding positive pulse which occurs when the triode 61*a* is extinguished, to fire whichever of the triodes 60*b* and 61*b* is not already conducting. Apart from this difference the remaining stages of the counter 7 are exactly the same as the first and operate in the same manner, for example the triodes 60*b* and 61*b* in the second stage being fired alternately on each occasion of extinguishing the triode 61*a*, that is on alternate occasions of applying a pulse to the first stage. In a similar manner the positive pulses at the common terminal of the resistors 65*b* and 66*b* in the cathode circuit of the triode 61*b*, which occur on each occasion of extinguishing the triode 61*b*, are applied to the third stage of the counter and so on.

A cold cathode diode 77*a* is connected between the lead 78 and the common terminals of the resistors 69 and 68*a* associated with the triode 61*a*, and similar diodes 77*b*–*e* are connected between the lead 78 and the intermediate terminal of the resistances 76*b*–*e* respectively. The lead 78 is connected to a contact 79 associated with a relay winding in the reset circuit 15, which contact is closed when it is required to reset the counter 7 to its datum condition with the triodes 61*a*–*e* all conducting. Closing the contact 79 connects the lead 78 to the terminal 62 thus applying a high tension voltage to the anodes of the diodes 77*a*–*e*, which causes them to fire thereby applying a positive potential to the trigger electrodes of the triodes 61*a*–*e*. This action results in any of the triodes 61*a*–*e*, which are not already conducting, being fired.

The gating circuits 9–13 each include a cold cathode diode 80*a*–*e* respectively, the cathodes of which are connected together to one terminal of a resistor 81, the other terminal of which is earthed. An output terminal 82 is also connected to the cathodes of the diodes 80*a*–*e*. The anodes of the diodes 80*a*–*e* are connected through the resistors 83 to the common terminals of the resistors 63*a*–*e* and 64*a*–*e* in the corresponding stage of the counter 7. Coupling capacitors 84 are connected between the anodes of the diodes 80*a*–*e* and digit pulse input terminals 85*a*–*e*. These terminals 85*a*–*e* are connected one to each of the output terminals D1–D5 respectively in the digit distributor 8 of the transmitter 1 (Figure 1). The amplitude of the pulses applied at the terminals 85*a*–*e* is insufficient to fire the diodes 80*a*–*e* unless the triode 60*a*–*e* in the associated stage of the counter 7 is conducting and a positive bias is therefore applied to the anode of the diode 80*a*–*e*. During each channel interval therefore the digit pulses occurring in the second-sixth time positions, which are applied at the terminals 85*a*–*e*, will cause the diodes 80*a*–*e* to conduct if the corresponding stage of the counter 7 is in the state in which the triode 60*a*–*e* is conducting. On firing of any of the diodes 80*a*–*e* the discharge current flowing in the common load resistor 81, results in a positive pulse appearing at the terminal 82.

The positive pulses appearing at the terminal 82 are applied to the gating circuit 14 which consists of a cold cathode triode 90, the anode of which is connected to terminal 91, at which a positive high tension voltage is applied, a cathode load resistor 92 being connected between the cathode and earth. An output terminal 93, connected to the cathode of the triode 90, is connected to the input of the output unit 4 of the transmitter 1 (Figure 1). The end of the trigger load resistor 94 remote from the trigger electrode is connected to one end of a coupling capactor 95, the other end of which is connected to the terminal 82. A resistor 96 is connected between the common terminals of the resistor 94 and the capacitor 95 and a terminal 97, which is connected to the synchronising channel output terminal CS of the channel distributor 6. It is arranged that the pulses applied to the gating circuit 14 from the terminal 82 can only fire the triode 90 when a positive bias is applied to the trigger electrode by the application of a pulse at terminal 97 from the channel distributor 6 during the synchronising channel intervals. Thus the only pulses appearing at the output terminal 93 of the gating circuit 14 occur during the synchronising channel intervals at some or all of the second-sixth time positions, and this group of pulses represents the state of the counter 7 corresponding to the number of pulses transmitted during the previous ten signalling channel intervals. This pulse code group is passed to the output unit 4 for transmission to the receiver 2.

The reset circuit 15 includes two cold cathode triodes 100 and 101 connected in a bistable trigger circuit. The trigger electrode circuits of both the triodes 100 and 101 are connected to terminal 58, so that a positive bias is applied to the trigger electrodes only during the synchronising channel intervals. The pulse input terminal 102 which is coupled to the trigger electrode of the triode 101, is connected to terminal D6 on the digit distributor 8 (Figure 1), so that in the synchronising channel interval, when the trigger electrode of the triode 100 is biassed positively, the pulse occurring at the seventh time position fires the triode 100, thereby causing current to pass through the winding 103 of the relay, of which the contact 79 in the counter 7 is part. At this time the triode 101 is normally conducting, and is extinguished by the negative pulse applied to its anode through the coupling capacitor 104. The pulse input terminal 105, coupled to the trigger electrode of the triode 101, is connected to the terminal D7 on the digit distributor 8. Positive pulses are therefore applied to the trigger electrode of the triode 101 at the eighth time position in each channel interval, and in the synchronising channel intervals when the triode 101 will have been extinguished at the previous time position, this pulse fires the triode 101 again, applying a negative pulse to the anode of the triode 100 and terminating the energisation of the relay winding 103. Pulses from the digit distributor terminals D6 and D7 have no effect on the triodes 100 and 101 in intervals other than the synchronising channel intervals, as the trigger electrodes of these valves are not then biassed positively. The relay winding 103 is therefore energised from the seventh to the eighth time position in each synchronising channel interval, operating the contact 79 and resetting the counter 7 to its datum condition in readiness for the next cycle of counting. A positive high tension voltage is connected to the terminal 106.

Figure 3 of the accompanying drawings shows a detailed circuit diagram of the parts of the block diagram of Figure 1 associated with the receiver 2, the various blocks being indicated by the dotted outlines, which are given the same references as in Figure 1.

The gating circuit 15 is the same as the gating circuit 5 of Figure 2 and will not be described in detail. The positive 150 volt amplitude line pulses are applied at the terminal 110, and the synchronising channel output from terminal CS of the receiver channel distributor 22 (Figure 1), which terminal is connected to the terminal 111 in Figure 2, is also applied to the gating circuit 15. The output pulses at the cathode of the cold cathode triode 112 are applied to the first stage of the counter 21, the pulses corresponding to all the pulses received at all times except during the synchronising channel intervals.

The counter 21 is almost identical with the counter 7. The only difference is that the contact 79 is omitted, the lead 78 being connected directly to a terminal 113, which is connected to the synchronising relay circuit 36 in the receiver 2, where somewhat after the seventh time position in the synchronising channel intervals, a relay is operated and held operated until the end of the interval. This relay has a contact which on operation applies a positive high tension voltage to the terminal 113, thereby firing the diodes connected to the lead 78 and resetting the counter 21 to its datum condition. As mentioned previously, the input to the counter 21 is a train of pulses corresponding to the pulses received during the signal channel intervals, and therefore during the synchronising channel intervals up to the time when the counter is reset to its datum condition, it is set up to represent the number of pulses received during the previous ten signal channel intervals.

As previously described the digit present circuits 28–32 each include a cold cathode triode, which is fired in any given channel interval, if the corresponding digit pulse is present in the pulse code group received. The digit present valves have cathode load resistors, so that when one is fired a positive potential may be derived from its cathode. The digit present circuits 28–32 are each coupled to the corresponding one of the comparison circuits 23–27. Thus for example the cathode of the triode in the digit present circuit 28 is connected to the terminals 115*a* in the comparison circuit 23, the connections of the other circuits being similar. The details of the comparison circuits 24–26 are omitted from Figure 3 as they are the same as those of the two circuits 23 and 27 that are shown, the external connections to the circuits 24–26 being indicated by arrows. Corresponding elements in the comparison circuits are given the same reference numbers with the appropriate suffixes *a–e*.

The gating circuit 34 includes two cold cathode triodes 116 and 117, to the trigger electrode of which a positive bias is applied when a synchronising channel pulse is applied at terminal 111. Pulses from the terminal D6 of the receiver digit distributor 33 (Figure 1) are applied to both the terminals 118, which are coupled to the trigger electrodes of the triodes 116 and 117. A positive high tension voltage is applied to the terminal 119, from the synchronising relay circuit 36 in the receiver 2. This potential is removed shortly after the start of the long synchronising pulse, i. e. somewhat after the seventh time position in the synchronising channel intervals, by operation of the relay in the synchronising relay circuit 36 which has been described previously. This extinguishes the triodes 116 and 117, if either of them are conducting, the potential being restored at the beginning of the next channel interval in readiness for the next cycle of operation. The digit pulses, applied to the trigger electrodes of the triodes 116 and 117, can only fire them when a positive bias is also applied to the trigger electrodes, that is during the synchronising channel intervals. When this happens a positive pulse appears at the cathode of the triode 116 and a negative pulse at the end of the triode 117. These pulses occur at the seventh time position in the synchronising channel intervals, and therefore after the digit present circuits 28–32 have been set up in accordance with the pulse code group occupying the second-sixth time positions in those intervals. At the same time the counter 21 will be set up in accordance with the number of line pulses received during the preceding ten signal channel intervals.

Each of the comparison circuits 23–27 is arranged to compare the state of the "0" triode (that is the right hand one in each stage as shown in Figure 3) in the corresponding stage of the counter 21, with that of the valve in the corresponding one of the digit present circuits 28–32. If the system is operated correctly, the "0" triodes should all be in the opposite state to the digit present valves, and the comparison circuits 23–27 must actuate the alarm circuit 35 if any pair of corresponding valves are either both conducting or both non-conducting. Each comparison circuit 23–27 is in two parts, one of which actuates the alarm circuit 35 if the two valves are both non-conducting and the other if they are both conducting. Only the comparison circuit 23 will be described, the others being exactly the same and being connected in a similar manner to the remainder of the apparatus.

The part of the comparison circuit 23 which actuates the alarm circuit 35 if both the said valves are conducting, includes a pair of cold cathode diodes 120*a* and 121*a*. If the valve in the digit present circuit 28 is conducting, a positive potential is applied at the terminals 115*a*, from the cathode of that valve. When therefore a positive pulse is generated at the cathode of the triode 116 in the gating circuit 34, the diode 120*a* is fired by the pulse which is applied to its anode through the coupling capacitor 122*a* in addition to the positive bias from the terminal 115*a* which is connected to the anode of the diode 120*a*. The discharge current flowing in the resistance 123*a* applies a positive pulse to the anode of the diode 121*a* through the coupling capacitor 124*a*. If the "0" triode in the first stage of the counter 21 is conducting, a positive potential is applied from its cathode to the anode of the diode 121*a*, which is fired if both the pulse and the potential are applied simultaneously. The cathodes of all the diodes 121*a–e* are connected together to the trigger electrode of the cold cathode triode 125 in the alarm circuit 35. A positive bias potential is applied to the trigger electrode of the triode 125, by applying a positive potential to the terminal 126, a pair of resistors 127 and 128 being connected in series between the terminal 126 and earth and a resistor 129 being connected between the common terminals of the resistors 127 and 128 and the trigger electrode of the triode 125. If any one of the diodes 121*a–e* is fired, a current pulse flows through the resistors 129 and 128 to earth applying an additional positive voltage to the trigger electrode of the triode 125 sufficient to fire it, thereby actuating the alarm circuit 35.

The other part of the comparison circuit 23, which actuates the alarm circuit 35 if the valve in the digit present circuit 28 and the "0" triode in the first stage of the counter 21 are both non-conducting, is similar and includes the cold cathode diodes 130*a* and 131*a*. A positive potential is applied in common to all the comparison circuits 23–27 from the terminal 132, which is the common terminal of the resistors 133 and 134 connected in series between the terminal 135 and earth, a positive potential being applied in operation to the terminal 135. In the comparison circuit 23, this potential is applied to the anode of the diode 130*a* and, if the valve in the digit present circuit 28 is non-conducting, i. e. if the terminals 115*a* are at earth potential, the diode 130*a* is fired when a negative pulse is applied to its cathode through the coupling capacitor 136*a* from the anode of the triode 117 in the gating circuit 34. On firing the diode 130*a* a negative pulse is applied through the coupling capacitor 137*a* to the cathode of the diode 131*a*, which is also connected through the resistor 138*a* to the cathode of the "0" triode in the first stage of the counter 21. The anodes of all the diodes 131*a–e* are connected together to one terminal of a common load resistor 139, the other terminal of which is connected to terminal 132. If the "0" triode is non-conducting, the negative pulse applied to the cathode of the diode 131*a* can fire it, generating a negative voltage pulse at the anode. This is passed through the common capacitor 140 to the cathode of the triode 125, firing it and thereby actuating the alarm circuit 35.

If the "0" triode in the first stage of the counter 21, and the valve in the digit present circuit 28 are not in the same state, as should occur if operation has proceeded correctly, and the counters 7 and 21 thereby register the same number, the potential applied to the comparison circuit 23 from the cathodes of the "0" triode and the valve in the digit present circuit 28, do not allow a pulse to be applied to the alarm circuit 35, when the triodes 116 and 117 in the gating circuit 34 are fired. The alarm circuit is therefore not actuated under these conditions.

The same conditions hold in the other comparison circuits 24–27, and the alarm circuit 35 is only actuated if the counters 7 and 21 register differently at the end of the corresponding counts.

It will be appreciated that a different type of comparison circuit could be employed, which compares the state of the "1" triode in each stage of the counter 21 with that of the valve in the corresponding one of the digit present circuits 28–32, and which actuates the alarm circuit 35 if their conditions are different.

The alarm circuit 35, which includes the triode 125 as previously mentioned, has the winding 145 of a relay connected between the terminal 146 and the anode of the triode 125, the positive high tension voltage supply for the triode 125 being applied at the terminal 146. A cathode load resistor 147 is also included. A make before break contact 148, operated on energising the winding 145, is connected between the winding 145 and the anode of the triode 125. On application of a positive pulse to the trigger electrode of the triode 125 or a negative pulse to its cathode, from any of the comparison circuits 23–27, the triode 125 is fired, energising the winding 145. The make part of the contact 148 completes a holding circuit for the winding 145 through the resistor 149 to earth, whilst the break part interrupts the discharge circuit of the triode 125. The relay has a further contact 150 which is closed when the winding 145 is energised and which completes a circuit between terminal 151 and earth across the cold cathode diode 152. A positive potential is applied to terminal 151, the diode 152 therefore being fired when the contact 150 is closed. The firing of the diode 152 is used as a visual indication that incorrect operation has occurred. When required the alarm circuit 35 may be reset by operating the push button contactor 153, which breaks the holding circuit for the winding 145. It will be appreciated that the alarm indicator here described is a simple one, and the energisation of the winding 145 may be utilised to operate more complex devices if required.

It will be understood that the basic principle of the invention may be carried out in a variety of ways depending on the nature of the system. Thus it may not be possible, as in the system described, to utilise part of a synchronising pulse group to transmit the check signals which supply the information regarding the state of the counter 7 at the transmitter 1. It may therefore be necessary to employ a separate channel for this purpose if the system is a multichannel one, or to interrupt the normal signals in a single channel system in order to transmit the check signals. For example in a single channel system the check signal may be transmitted periodically after a given number of pulse code groups have been transmitted. As previously mentioned the scale of the counters may be varied depending on the opposed considerations of simplicity and economy, and the accuracy of the check that is required.

In a pulse code modulation signalling system other than a telemetering system, the receipt of false pulses or the non-receipt of pulses may give rise to visible or audible distortion, and a warning is not so necessary in that case. However it may be useful to know that the reason for the distortion is due to pulse interference or suppression, and not for example due to inaccuracies in coding or decoding.

We claim:

1. An electric pulse code modulation signalling system including a transmitter for transmitting successive pulse code groups representing a signal, and a receiver for receiving the pulse code groups and reproducing the signal, the transmitter including binary counting means for counting the number of pulses transmitted during each of a series of intervals of time during operation, means for deriving and transmitting at the end of each one of said intervals a check signal representing the number registered by the counting means at the end of that interval, the check signal comprising a binary pulse code group having the same number of time positions as there are stages in the counting means and the pulse element occurring at each time position representing the state of a corresponding stage of the counting means, said means for deriving and transmitting a check signal comprising a group of gating circuits, equal in number to the number of stages in the counting means, each gating circuit having a signal input and a signal output between which signals can pass when an applied control potential takes a suitable value, means for applying a control potential from each stage of the counting means to a corresponding one of the gating circuits to allow signals to pass through it only when the said stage is in one of its two possible conditions (the one condition being the same in each stage), distributor means for applying pulses to the signal inputs of the gating circuits, the pulses applied to each gating circuit occurring one during each check signal pulse code group at the time position corresponding to the stage of the counting means which controls that gating circuit, and means connecting the signal outputs of the gating circuits to a common output circuit, and the receiver including binary counting means having the same number of stages as the transmitter counting means and being arranged to count the number of pulses received during each of the corresponding series of intervals, means at the receiver responsive to the receipt of each check signal for comparing the numbers registered by the transmitter counting means and the receiver counting means at the end of corresponding intervals, and means responsive to any difference in said numbers.

2. An electric pulse code modulation signalling system according to claim 1 in which the receiver includes a group of digit present circuits equal in number to the number of stages in the two counting means, each of which circuits includes a discharge valve which is rendered conducting on receipt of a check signal pulse code group if a particular pulse element is present at the corresponding time position in that group, and a group of comparison circuits, equal in number to the number of stages in the two counting means, to each of which comparison circuits control potentials are applied both from a corresponding stage of the receiver counting means and from the corresponding digit present circuit, means for actuating the comparison circuits after receipt of a check signal pulse code group to compare the two control potentials applied to each of them and to provide an output signal if on comparison of the control potentials they represent a condition in which the corresponding stages of the transmitter and receiver counting means are not in the same state at the end of the interval concerned, and means for applying the output signals from the comparison circuits to said responsive means.

3. A multichannel electric pulse code modulation signalling system including a transmitter for transmitting successive pulse code groups representing a plurality of signals, the pulse code groups representing a particular one of the signals being transmitted during the time intervals allotted to one of the channels of the system and a receiver for receiving the pulse code groups and reproducing the plurality of signals at separate outputs, the transmitter including binary counting means for counting the number of pulses transmitted during each of a series of groups of channel intervals in operation, means for deriving and transmitting at the end of each one of said groups of channel intervals a check signal representing the number registered by the counting means at the end of that group of channel intervals, the check signal comprising a binary pulse code group having the same number of time positions as there are stages in the counting means and the pulse element occurring at each time position representing the state of a corresponding stage of the counting means, said means for deriving and transmitting a check signal comprising a group of gating circuits, equal in number to the number of stages in the counting means, each gating circuit having a signal input and a signal output between which signals can pass when an applied control potential takes a suitable value, means for applying a control potential from each stage of the counting means to a corresponding one of the gating circuits to allow signals to pass through it only when the said stage is in one of its two possible conditions (the one condition being the same in each stage), distributor means for applying pulses to the signal inputs of the gating circuits, the pulses applied to each gating circuit occurring one during each check signal pulse code group at the time position corresponding to the stage of the counting means which controls that gating circuit, and means connecting the signal outputs of the gating circuits to a common output circuit, and the receiver including binary counting means having the same number of stages as the transmitter counting means and being arranged to count the number of pulses received during each of the corresponding series of groups of channel intervals, means at the receiver responsive to the receipt of each check signal for comparing the numbers registered by the transmitter counting means and the receiver counting means at the end of corresponding groups of channel intervals, and means responsive to any difference in said numbers.

4. A multichannel electric pulse code modulation signalling system according to claim 3 in which the receiver includes a group of digit present circuits equal in number to the number of stages in the two counting means, each of which circuits includes a discharge valve which is rendered conducting on receipt of a check signal pulse code group if a particular pulse element is present at the corresponding time position in that group, and a group of comparison circuits, equal in number to the number of stages in the two counting means, to each of which comparison circuits control potentials are applied both from a corresponding stage of the receiver counting means and from the corresponding digit present circuit, means for actuating the comparison circuits after receipt of a check signal pulse code group to compare the two control potentials applied to each of them and to provide an output signal if on comparison of the control potentials they represent a condition in which the corresponding stages of the transmitter and receiver counting means are not in the same state at the end of the interval concerned, and means for applying the output signals from the comparison circuits to said responsive means.

5. A multichannel electric pulse code modulation signalling system according to claim 3 in which each group of channel intervals comprises an equal number of channel intervals.

6. A multichannel electric pulse code modulation signalling system according to claim 3 in which each group of channel intervals comprises a complete cycle of the signal channel intervals.

7. A multichannel electric pulse code modulation signalling system according to claim 6 in which a synchronizing channel interval is interleaved between each complete cycle of signal channel intervals, and the check signal, representing the number of pulses transmitted in each cycle of signal channel intervals, is transmitted in addition to the synchronizing signal during the next following synchronizing channel interval.

8. A multichannel electric pulse code modulation signalling system according to claim 7 in which the synchronizing signal includes a distinct pulse signal, and the check signal pulse code groups are distinct from the synchronizing pulse signal.

References Cited in the file of this patent

UNITED STATES PATENTS

| Number | Name | Date |
|---|---|---|
| 1,972,326 | Angel | Sept. 4, 1934 |
| 2,512,038 | Potts | June 20, 1950 |
| 2,596,199 | Bennett | May 13, 1952 |
| 2,622,148 | Van Duuren | Dec. 16, 1952 |